(12) United States Patent
Hsu

(10) Patent No.: US 6,513,844 B1
(45) Date of Patent: *Feb. 4, 2003

(54) GRIPPING DEVICE HAVING GRIPPING AND LOCKING MECHANISMS

(76) Inventor: Shih Hao Hsu, No. 426, Dou Yuan East Road, Bi Tou Hsiang, Chang Hua Hsien 523 (TW)

(*) Notice: Subject to any disclaimer, the term of this patent is extended or adjusted under 35 U.S.C. 154(b) by 0 days.

This patent is subject to a terminal disclaimer.

(21) Appl. No.: 09/912,676

(22) Filed: Jul. 25, 2001

(51) Int. Cl.$^7$ .................................................. B25J 1/00
(52) U.S. Cl. ...................................... 294/19.1; 294/115
(58) Field of Search ........................ 294/11, 19.1, 19.3, 294/22, 23, 50.8, 50.9, 111, 115, 116; 403/109.1, 109.2, 109.7

(56) References Cited

U.S. PATENT DOCUMENTS

| | | | | |
|---|---|---|---|---|
| 182,367 A | * | 9/1876 | Jones | 111/101 |
| 465,222 A | * | 12/1891 | Ulbricht | 294/104 |
| 919,731 A | * | 4/1909 | La May | 294/22 |
| 923,376 A | * | 6/1909 | Savage | 294/22 |
| 1,024,991 A | * | 4/1912 | Hunt | 294/22 |
| 1,051,374 A | * | 1/1913 | Agin | 294/22 |
| 3,317,997 A | * | 5/1967 | Hedstrom et al. | 16/429 |
| 4,483,562 A | * | 11/1984 | Schoolman | 294/104 |
| 4,962,957 A | * | 10/1990 | Traber | 294/100 |

* cited by examiner

Primary Examiner—Dean J. Kramer
(74) Attorney, Agent, or Firm—Charles E. Baxley

(57) ABSTRACT

A gripping device includes a hand grip rotatably secured to a handle with a shaft, a base secured to the handle, a pair of gripping fingers rotatably secured to the base and coupled to the hand grip which may actuate the gripping fingers to grasp an object. A device may lock the hand grip to the handle with a pivotal pawl. A button may selectively lock the pawl to the hand grip. A tube and a pipe are adjustably secured between the handle and the gripping fingers. A cable is secured to the hand grip, and a beam is selectively secured to the cable with teeth engagement.

16 Claims, 11 Drawing Sheets

GRIPPING DEVICE HAVING GRIPPING AND LOCKING MECHANISMS

BACKGROUND OF THE INVENTION

1. Field of the Invention

The present invention relates to a gripping device, and more particularly to a gripping device having a gripping and locking mechanism for locking the gripping fingers in the holding or grasping or gripping position.

2. Description of the Prior Art

Typical gripping devices comprise a pair of longitudinal or straight gripping fingers rotatably secured to a base, and a pair of handles also rotatably secured to the base and coupled to the gripping fingers for rotating or moving or actuating the gripping fingers to grasp or hold the objects. However, the users have to force, with the hands thereof, the gripping handles toward each other to apply the grasping force against the object, all the time while grasping the object, and to solidly grip the object in place before the object is released. In addition, the handles are directly coupled to the gripping fingers with linking cables or bars that may not be bent or deformed, such that the gripping devices may not be adjusted to different lengths.

The present invention has arisen to mitigate and/or obviate the afore-described disadvantages of the conventional gripping devices.

SUMMARY OF THE INVENTION

The primary objective of the present invention is to provide a gripping device including a locking mechanism for locking the gripping fingers in the holding or grasping or gripping position.

In accordance with one aspect of the invention, there is provided a gripping device comprising a handle body, a hand grip rotatably secured to the handle body with a shaft, and rotatable toward and away from the hand grip about the shaft, a base secured to the handle body, a pair of gripping fingers rotatably secured to the base and rotatable toward and away from each other, means for coupling the hand grip to the gripping fingers to actuate the gripping fingers to grasp an object with the hand grip, and means for locking the hand grip to the handle body.

The locking means includes a pawl rotatably secured to the hand grip and having a first end for engaging with the handle body and for locking the hand grip to the handle body when the hand grip is rotated toward the handle body. The handle body includes a plurality of teeth formed therein, the first end of the pawl includes at least one tooth formed thereon for engaging with the teeth of the handle body and for locking the hand grip to the handle body.

The handle body includes a sector gear secured therein and having the teeth provided thereon for engaging with the tooth of the pawl. A spring biasing device may further be provided for biasing the first end of the pawl to engage with the handle body.

A latching device may further be provided for latching the pawl to the hand grip and includes a button slidably secured to the hand grip and having a tongue for engaging with the pawl and for latch and locking the pawl to the hand grip. A device may further be provided for positioning the button to the hand grip. The coupling means includes a follower slidably received in the base, a pair of links pivotally coupling the follower to the gripping fingers respectively, and means for connecting the follower to the hand grip.

The connecting means includes a beam secured to the follower, a cable secured to the hand grip, and means for detachably securing the cable to the beam.

The detachably securing means includes a plurality of teeth formed on the beam, a bar for coupling to the cable and having at least one tooth formed thereon for engaging with the teeth of the beam, and means for forcing the tooth of the bar to the teeth of the beam.

The forcing means includes a housing secured to the cable, the beam is engaged in the housing, the bar is slidably received in the housing, and means for guiding the bar toward the beam.

The guiding means includes at least one pole secured in the housing, and at lease one inclined slot formed in the bar for slidably receiving the pole and for guiding the bar to move toward the beam. The guiding means includes means for biasing the bar toward the base. A tube is further provided and secured to the handle body, and a pipe is also provided and secured between the tube and the base. A device is further provided for adjusting the tube relative to the pipe.

A device is further provided for limiting a relative movement between the hand grip and the handle body, and includes a rod rotatably secured to the handle body and having an extension for detachably engaging with the hand grip by rotating the rod relative to the handle body.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
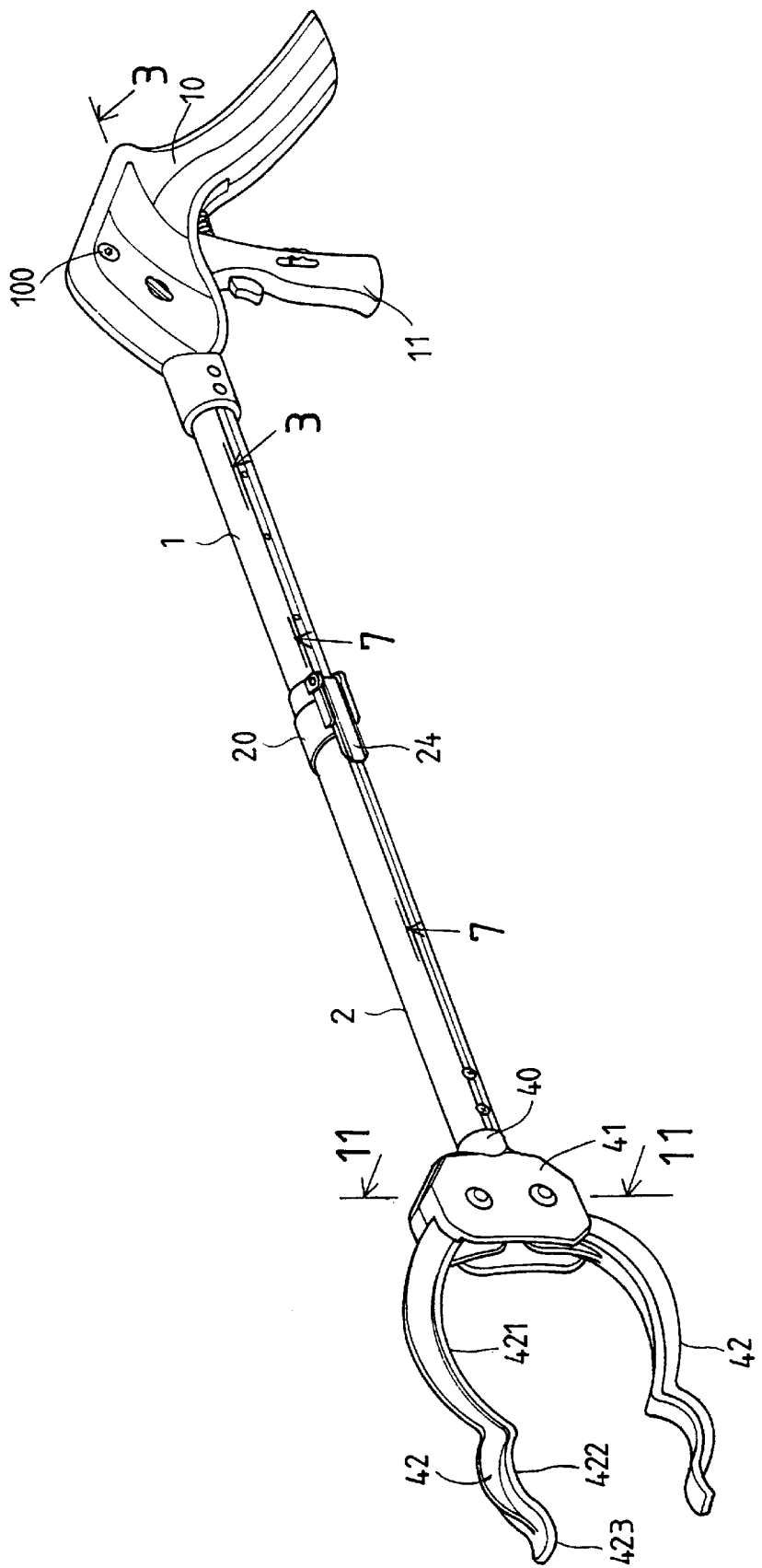
FIG. 1 is a perspective view of a gripping device in accordance with the present invention.
Figure 2:
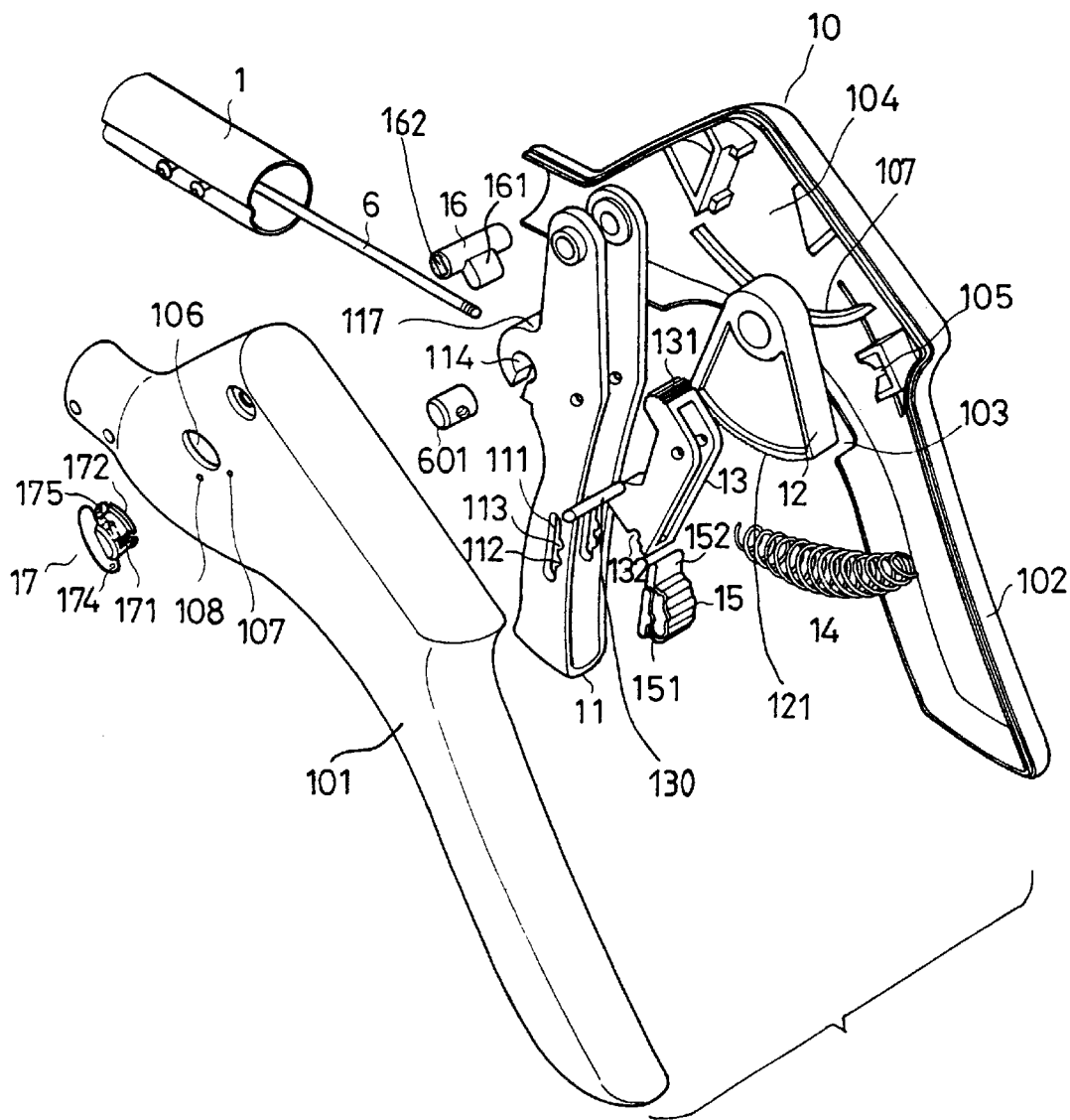
FIG. 2 is a partial exploded view of the handle portion of the gripping device.

Referring to the drawings, and initially to FIGS. 1–5, a gripping device in accordance with the present invention comprises a handle body 10 including such as two handle members 101, 102 secured together by fasteners, and/or with adhesive materials, or by welding processes. The handle body 10 includes a space 104 formed in the upper portion thereof and formed or defined by a peripheral wall 107. A sector gear 12 is received in the space 104 of the handle body 10 and retained in the peripheral wall 107 and and secured to the handle body 10 with the fastener or the shaft 100 or the like, and includes a number of teeth 121 formed or provided in the bottom portion thereof. The handle body 10 includes an opening 103 formed in the middle portion thereof and located below the sector gear 12. A hand grip 11 has an upper portion extended inward of the handle body 10 through the opening 103 of the handle body 10, and pivotally or rotatably secured to the handle body 10 with the shaft 100, such that the hand grip 11 may be moved toward and away from the handle body 10 about the shaft 100.

The handle body 10 has a front portion secured to one end of a tube 1. A longitudinal member, such as a longitudinal cable 6 or a wire or the like is received in the tube 1, and has a stop 601 secured to one end thereof. The hand grip 11 includes a socket opening 114 formed in the middle portion thereof for receiving the stop 601 and for coupling the cable 6 to the hand grip 11, such that the cable 6 may be moved toward and away from the handle body 10 by the hand grip 11. A pawl 13 has a middle portion rotatably or pivotally secured to the hand grip 11 with a pivot pin 130, and includes one or more teeth or ratchet teeth 131 formed on the upper portion thereof for engaging with the sector gear 12 (FIGS. 3, 5), and for preventing the hand grip 11 from moving away from the handle body 10 and for allowing the hand grip 11 to move toward the handle body 10 only when the teeth 131 are engaged with the sector gear 12. A spring 14 is engaged between a seat 105 of the handle body 10 and the pawl 13 for biasing the teeth 131 of the pawl 13 to engage with the sector gear 12.

Figure 3:
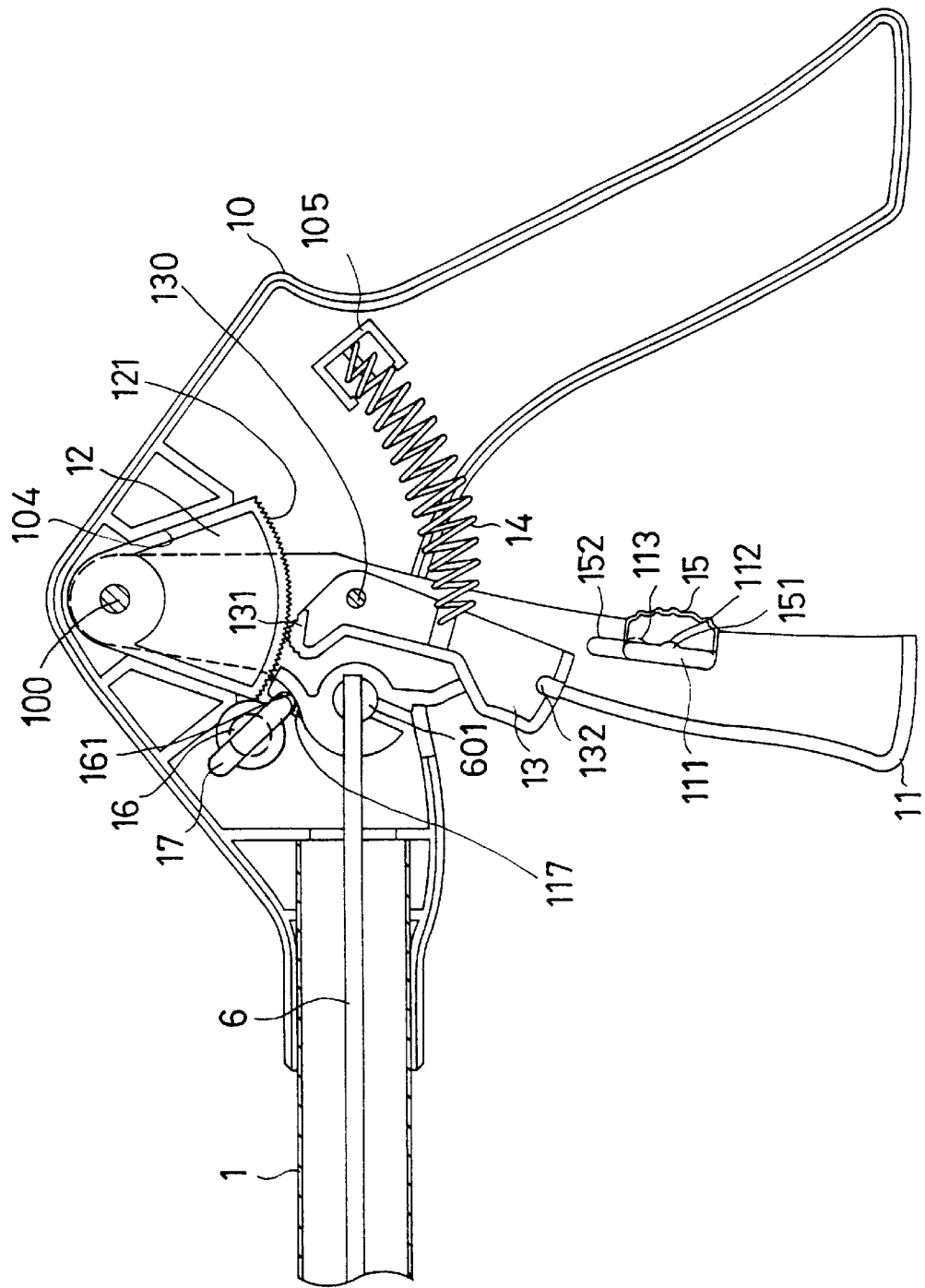
FIG. 3 is a partial cross sectional view taken along lines 3—3 of FIG. 1.
Figure 4:
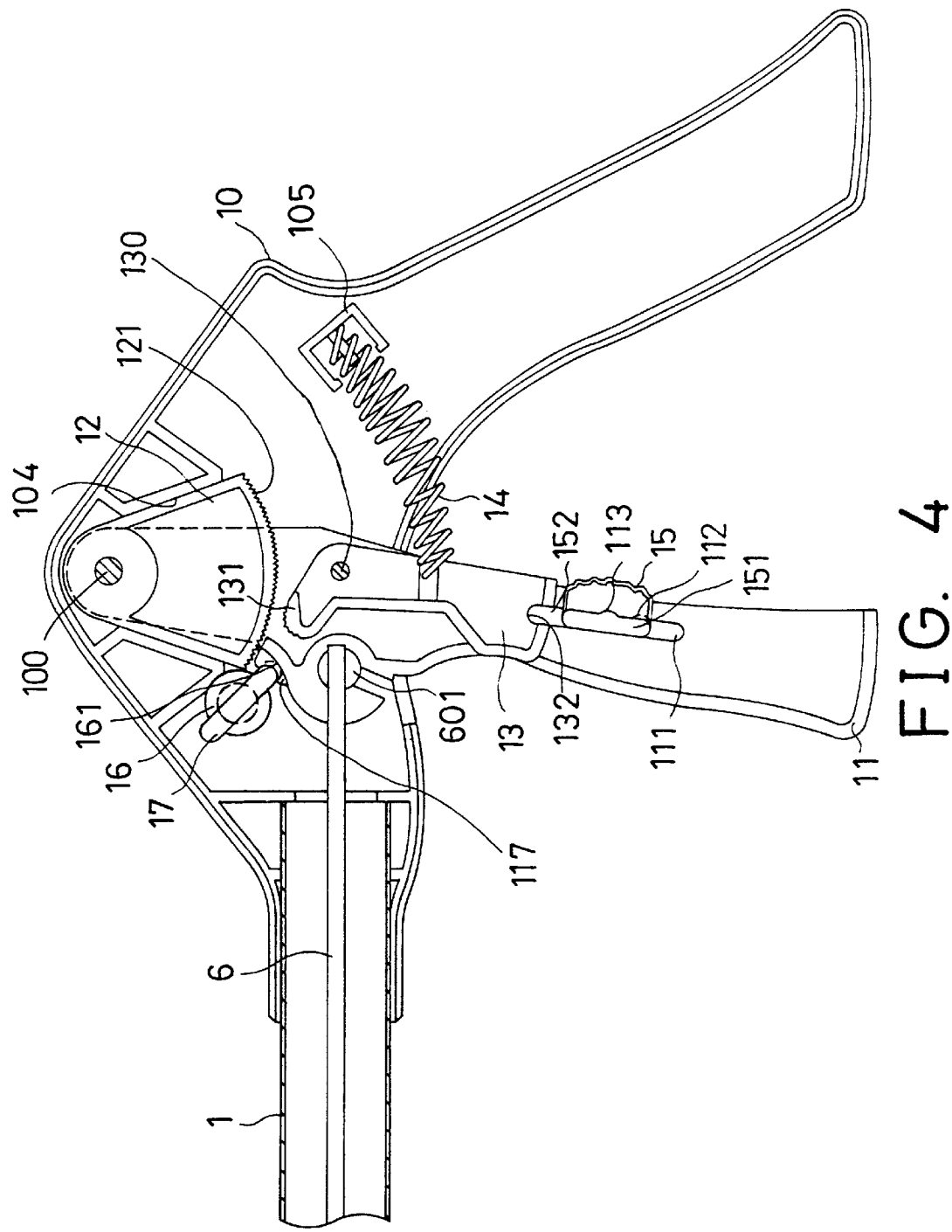
FIGS. 4, 5 are partial cross sectional views similar to FIG. 3, illustrating the operation of the gripping device.
Figure 5:
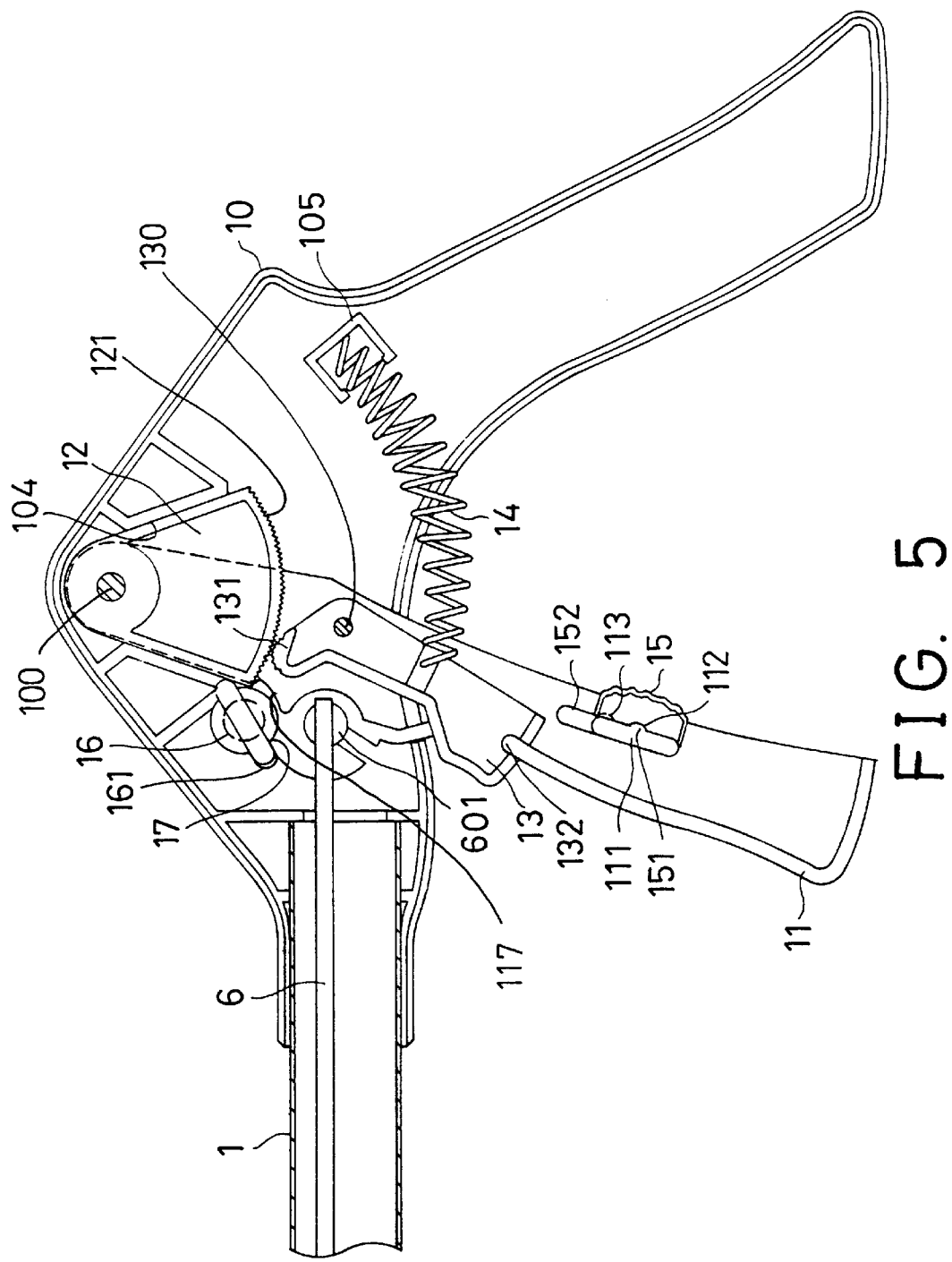
Figure 6:
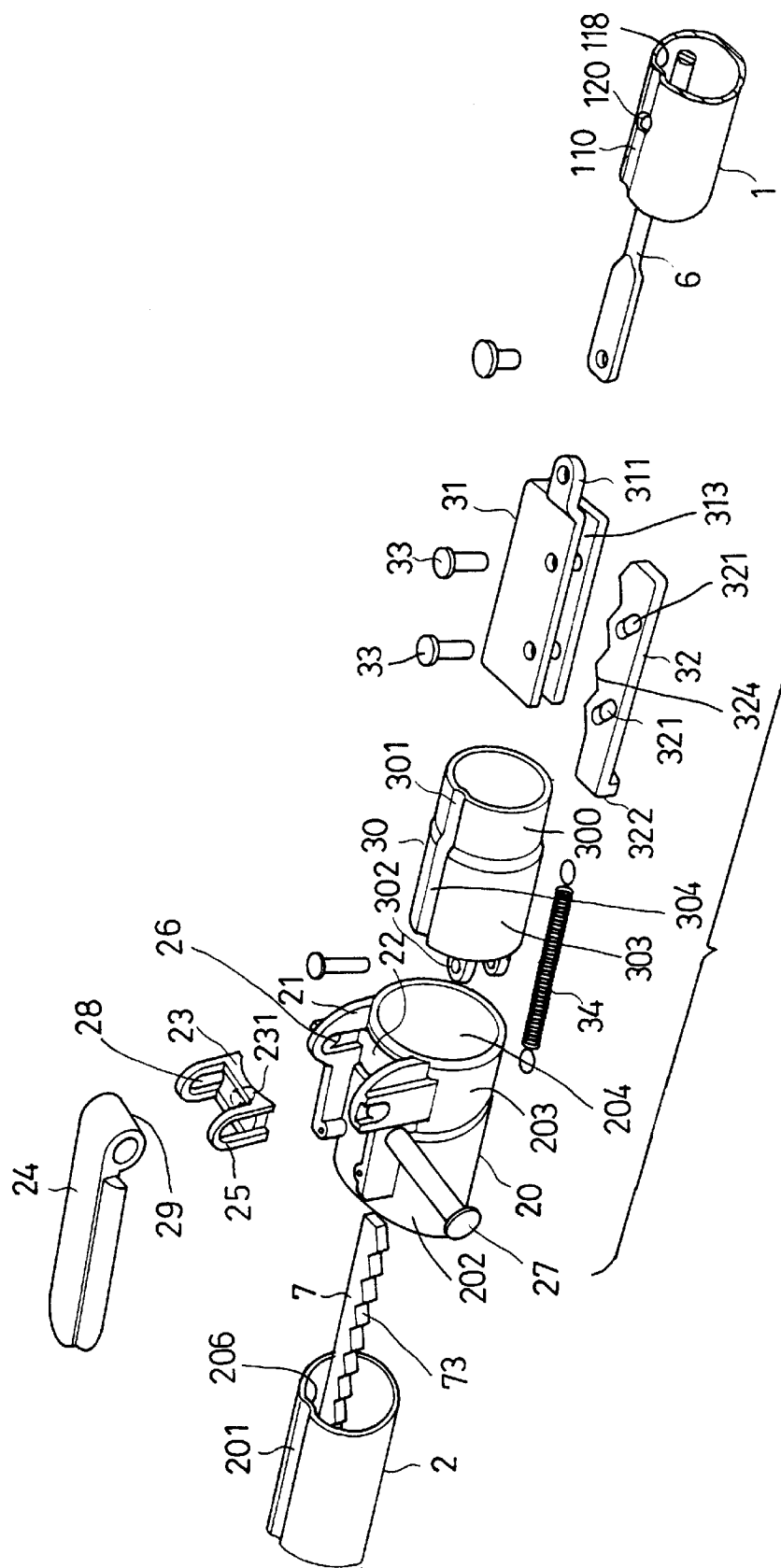
FIG. 6 is a partial exploded view of the longitudinal body portion of the gripping device.
Figure 7:
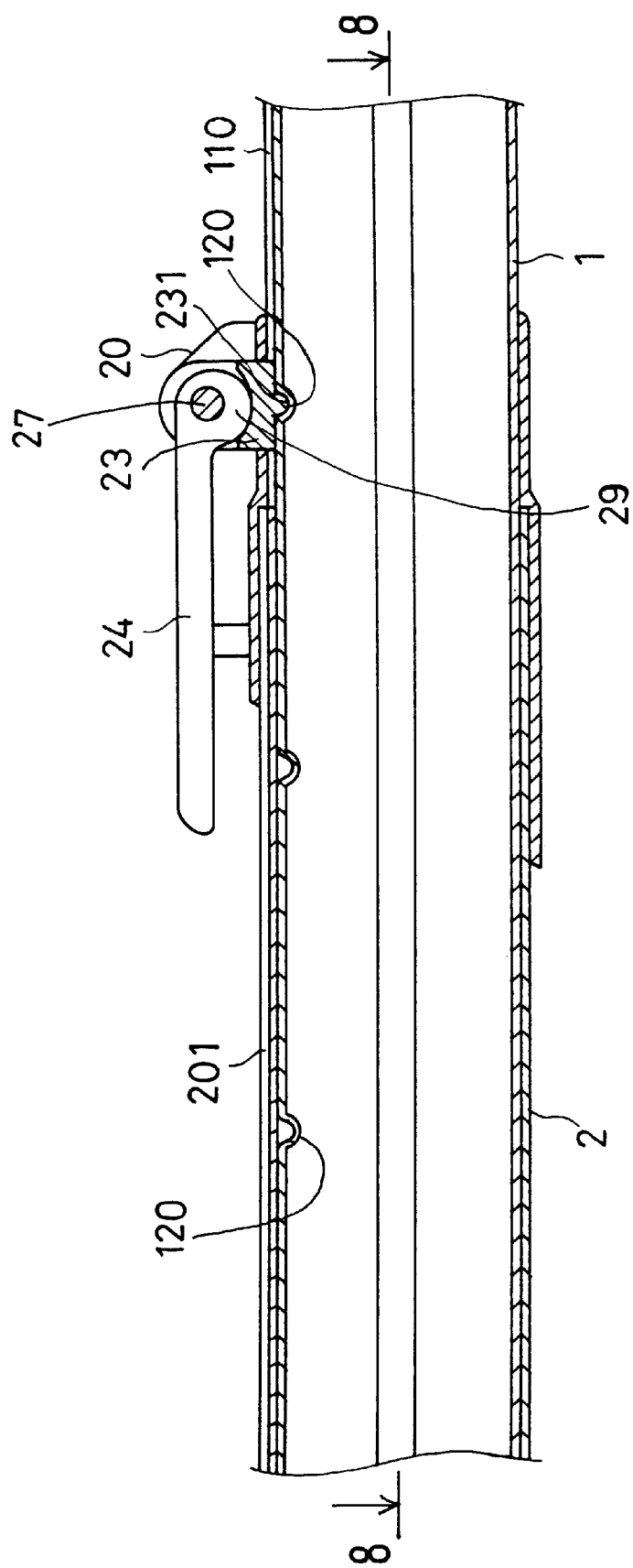
FIG. 7 is a partial cross sectional view taken along lines 7—7 of FIG. 1.

As best shown in FIGS. 3–5, the pawl 13 includes a lower portion extended forward or outward of the hand grip 11 when biased by the spring 14, such that the lower portion of the pawl 13 may be moved inward of the hand grip 11 against the spring 14 (FIG. 4), in order to disengage the teeth 131 of the pawl 13 from the sector gear 12. The hand grip 11 may thus be freely moved toward and away from the handle body 10 when the teeth 131 of the pawl 13 are disengaged from the sector gear 12 and when the lower portion of the pawl 13 has been moved inward of the hand grip 11 against the spring 14. The pawl 13 includes a lock notch 132 formed in the lower portion thereof. The hand grip 11 includes one or more channels 111 formed in the middle or lower portion thereof, and includes two depressions 112, 113 formed therein and communicating with each of the channels 111 thereof.

A button 15 is slidably engaged in the channels 111 of the hand grip 11, and includes a tongue 152 for engaging into the lock notch 132 of the pawl 13 and for securing the pawl 13 to the hand grip 11, and includes one or more protrusions 151 extended laterally therefrom for engaging with either of the depressions 112, 113 of the hand grip 11 and for securing or maintaining the button 15 relative to the pawl 13. For example, as shown in FIG. 4, when the tongue 152 of the button 15 is moved and engaged into the lock notch 132 of the pawl 13, the pawl may be secured to the hand grip 11, and the teeth 131 of the pawl 13 may thus be disengaged from the sector gear 12, such that the hand grip 11 may thus be freely moved toward and away from the handle body 10. At this moment, the protrusion(s) 151 of the button 15 are engaged with the depression(s) 113 of the hand grip 11, in order to maintain the engagement of the tongue 152 of the button 15 in the lock notch 132 of the pawl 13. The protrusion(s) 151 of the button 15 may be engaged with the other depression(s) 112 of the hand grip 11 when the tongue 152 of the button 15 are disengaged from the lock notch 132 of the pawl 13.

The hand grip 11 includes a seat 117 formed or provided in the middle or upper portion thereof. A rod 16 is rotatably secured in the handle body 10 and includes an extension 161 extended therefrom, for engaging with the seat 117 of the hand grip 11 (FIGS. 3, 4), in order to limit the forward movement of the hand grip 11 relative to the handle body 10. A knob 17 has a shank 171 rotatably secured in an aperture 106 of the handle body 10 and has a peripheral flange 172 for engaging with the handle body 10 and for rotatably securing the shank 171 of the knob 17 to the handle body 10. The knob 17 includes a jut 175 extended therefrom and engaged into a recess 162 of the rod 16 (FIG. 2), such that the rod 16 may be rotated by the knob 17, and such that the extension 161 of the rod 16 may be rotated, by the knob 17, to engage with the seat 117 of the handle body 10 or to be disengaged from the handle body 10. The knob 17 includes a projection 174 extended therefrom for engaging with either of two holes 107, 108 of the handle body 10 and for positioning the knob 17 and the rod 16 to the handle body 10, and for maintaining the extension 161 of the rod 16 in either engagement with (FIGS. 3, 4) or disengaging from the handle body 10 (FIG. 5).

Referring next to FIGS. 1 and 6–9, the tube 1 includes a longitudinal groove 110 formed therein and defined by a swelling 118 (FIG. 6) that is extended inward of the tube 1, and one or more cavities 120 formed therein (FIG. 7) and communicating with the groove 110 thereof. A sleeve 30 includes a rear portion 300 having a reduced diameter for engaging into the front end of the tube 1 (FIGS. 8, 9) and secured to the tube 1 with such as a force-fitted engagement, or with adhesive materials, or by welding processes. The rear portion 300 of the sleeve 30 includes a recess 301 formed therein for receiving the swelling 118 of the tube 1 and for preventing the sleeve 30 from rotating relative to the tube 1. The sleeve 30 includes a front portion 303 having an outer diameter equal to that of the tube 1 and having a groove 304 formed therein and aligned with the groove 110 of the tube 1. The sleeve 30 includes an extension 302 extended forward therefrom.

A barrel 20 includes a front portion 202 engaged onto the rear end of a pipe 2 and secured to the pipe 2 with such as a force-fitted engagement, or with adhesive materials, or by welding processes such that the barrel 20 moves in concert with the pipe 2. The barrel 20 includes a rear portion 203 having a reduced diameter that is equal to that of the pipe 2 (FIGS. 8, 9), such that the sleeve 30 and the front portion of the tube 1 may be slidably engaged into the pipe 2 and the interior 204 of the rear portion 203 of the barrel 20. The pipe 2 also includes a longitudinal groove 201 formed therein and defined by a swelling 206 (FIG. 6) that is extended inward of the pipe 2 for slidably engaging into the grooves 110, 304 of the tube 1 and the barrel 20, and for guiding the tube 1 and the sleeve 30 to move relative to the pipe 2 and the barrel 20 and for preventing the tube 1 and the sleeve 30 from being rotated relative to the pipe 2 and the barrel 20.

The barrel 20 includes a pair of ears 21 extended therefrom and each having a hole 26 formed therein for receiving an axle 27 therein, and a passage 22 formed therein and located between the ears 21. A latch 23 is slidably engaged between the ears 21 and movable inward of the barrel 20 via the passage 22 of the barrel 20, and also includes a pair of ears 25 extended therefrom and each having an oblong hole 28 formed therein for slidably receiving the axle 27 and for allowing the latch 23 to move inward through the passage 22 of the barrel 20 relative to the axle 27. The latch 23 includes a catch 231 extended therefrom for engaging into either of the cavities 120 of the tube 1 (FIG. 7) for adjustably securing the tube 1 to the pipe 2 and for allowing the tube 1 to be moved or adjusted relative to the pipe 2 when the catch 231 of the latch 23 is disengaged from the tube 1. A cam 29 is formed or provided on one end of a lever 24 and is rotatably engaged on the axle 27, and is engaged with the latch 23, such that the catch 231 of the latch 23 may be forced or caused to engage into either of the cavities 120 of the tube 1 or to be disengaged from the tube 1 when the cam 29 is rotated relative to the axle 27 and the barrel 20 by the lever 24.

Referring next to FIGS. 1 and 10–12, a base 40 is secured to the front end of the pipe 2 with such as fasteners or the like, and includes a pair of flaps 41 extended therefrom. A pair of gripping fingers 42 each includes a rear end 424 pivotally or rotatably secured to the flaps 41 with pivot poles 413 respectively, and each includes one or more curved recesses 421, 422, 423 formed therein and having different curvatures for holding or grasping or gripping objects of different diameters. The flaps 41 each includes a channel or a track 411 (FIG. 10) or the like formed therein. A follower 44 has two ears 442 extended therefrom and slidably engaged in the tracks 411 of the flaps 41 for guiding the follower 44 to move forward and rearward relative to the flaps 41. A pair of links 43 have a rear end pivotally or rotatably secured to the front end of the follower 44 with a pivot pin 441, and each has a front end pivotally secured to a lateral extension 425 of the respective gripping fingers 42, such that the gripping fingers 42 may be caused to rotate or to move toward each other (FIG. 12) or to be moved away from each other (FIG. 11) when the follower 44 is moved along the tracks 411 of the flaps 41.

A beam 7 is slidably received in the pipe 2 and has a front end secured to the follower 44 with a fastener 71 or the like, such that the movement of the beam 7 in the pipe 2 may cause the gripping fingers 42 to grasp or to grip the objects or to release the objects. The beam 7 includes a number of teeth 73 formed thereon, preferably the ratchet teeth or the like. A spring 45 is engaged on the beam 7 and engaged between the base 40 and the follower 44 for moving the follower 44 forward and for forcing the gripping fingers 42 to move away from each other (FIG. 11), and for allowing the gripping fingers 42 to be easily engaged onto the objects.

Referring again to FIGS. 6, 8 and 9, a housing, preferably a parallelepiped housing 31 is slidably received or engaged in the tube 1, and is engaged with such as the swelling 118 of the tube 1 or the other guiding ribs (not shown), for preventing the housing 31 from rotating relative to the tube 1. The housing 31 includes an extension 311 coupled to the front end of the cable 6 such that the housing 31 may be moved forward and rearward by the cable 6 and thus by the hand grip 11. The housing 31 includes a channel 313 formed therein, and one or more guide poles 33 are secured to the housing 31 and engaged through the channel 313 of the housing 31. The beam 7 is relatively and slidably engaged in the channel 313 of the housing 31 (FIGS. 8, 9).

A bar 32 is slidably received in the channel 313 of the housing 31, and includes one or more guiding slots 321 formed therein for slidably receiving the guide poles 33 respectively, and includes one or more teeth 324 formed thereon, preferably the ratchet teeth or the like formed thereon for engaging with the teeth 73 of the beam 7. The guide slots 321 are inclined relative to the bar 32 and relative to the housing 31, such that the bar 32 may be moved inclinedly forward and rearward relative housing 31 and may thus be forced to move toward and away from the beam 7, by the sliding engagement of the poles 33 in the inclined slots 321, and such that the teeth 324 of the bar 32 may be caused to engage with or to be disengaged from the teeth 73 of the beam 7 (FIGS. 8, 9). The bar 32 includes a hook or an extension 322 extended forward therefrom for engaging with the rear end of the sleeve 30 (FIGS. 8, 9). A spring 34 is coupled between the extensions 302 and 322 of the sleeve 30 and the bar 32 for pulling or forcing the bar 32 to move toward the sleeve 30 (FIG. 8), and thus for forcing the teeth 324 of the bar 32 to engage with the teeth 73 of the beam 7, such that the beam 7 may be moved forward and rearward by the cable 6 and thus the hand grip 11 in order to actuate the gripping fingers 42.

Figure 8:
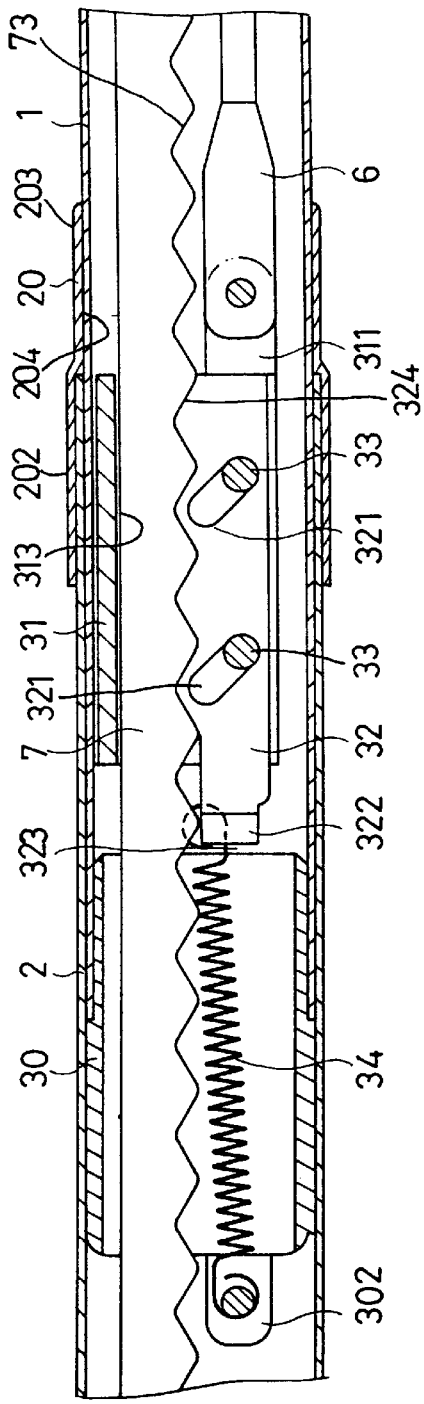
FIG. 8 is a partial cross sectional view taken along lines 8—8 of FIG. 7.
Figure 9:
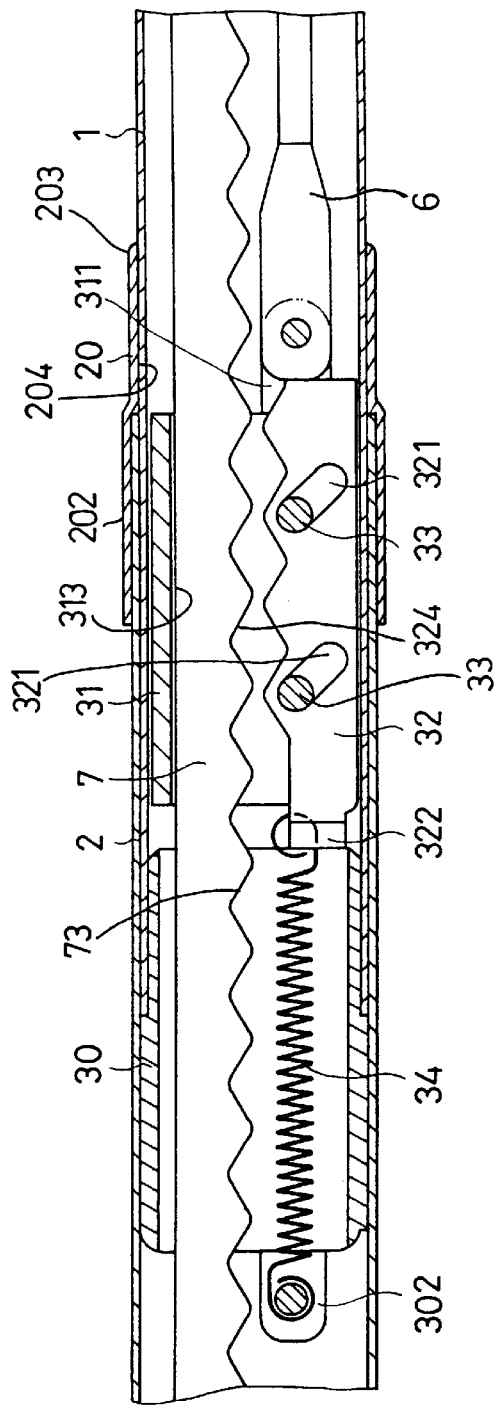
FIG. 9 is a partial cross sectional view similar to FIG. 8, illustrating the operation of the gripping device.
Figure 10:
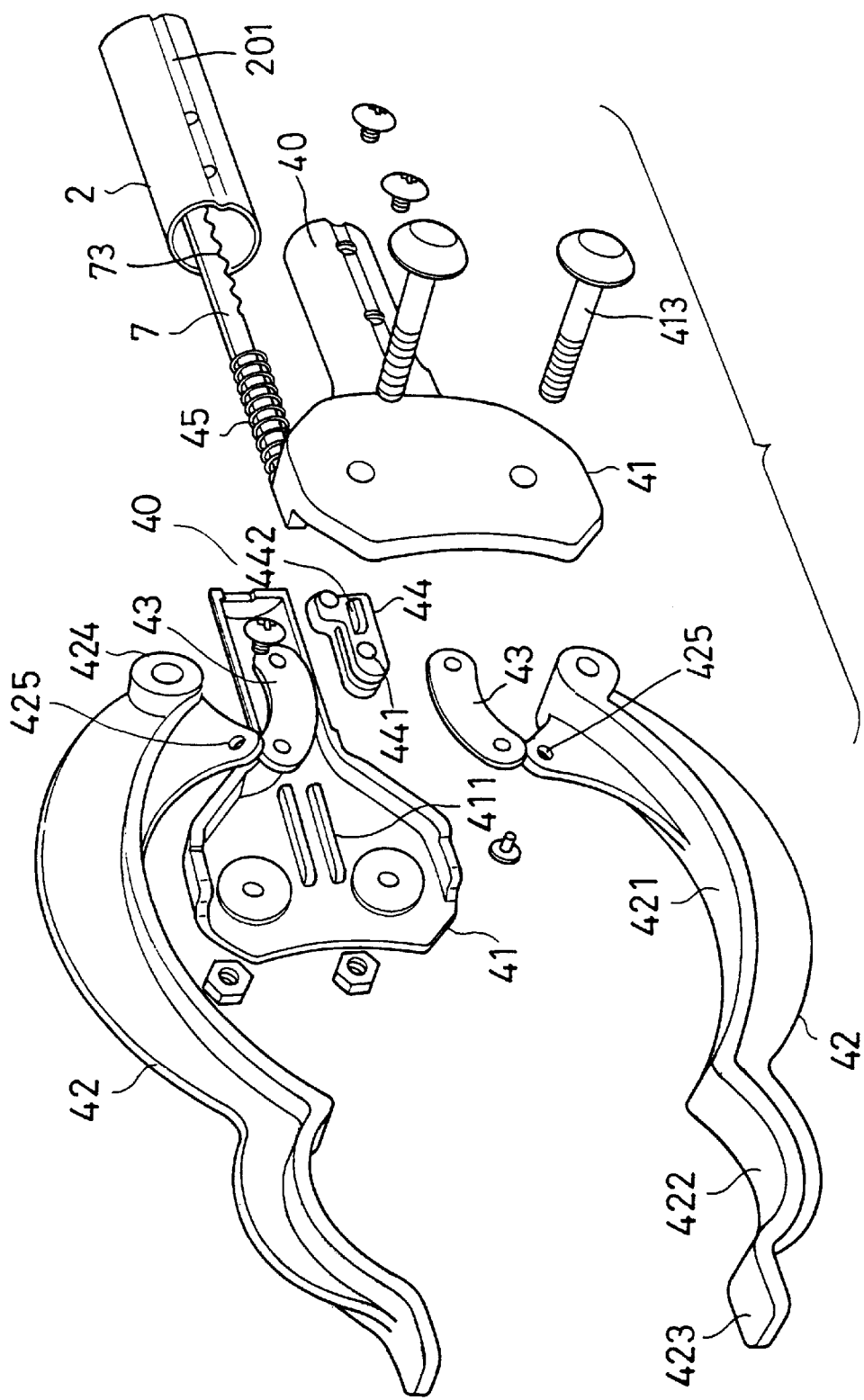
FIG. 10 is a partial exploded view of the gripping portion of the gripping device.
Figure 11:
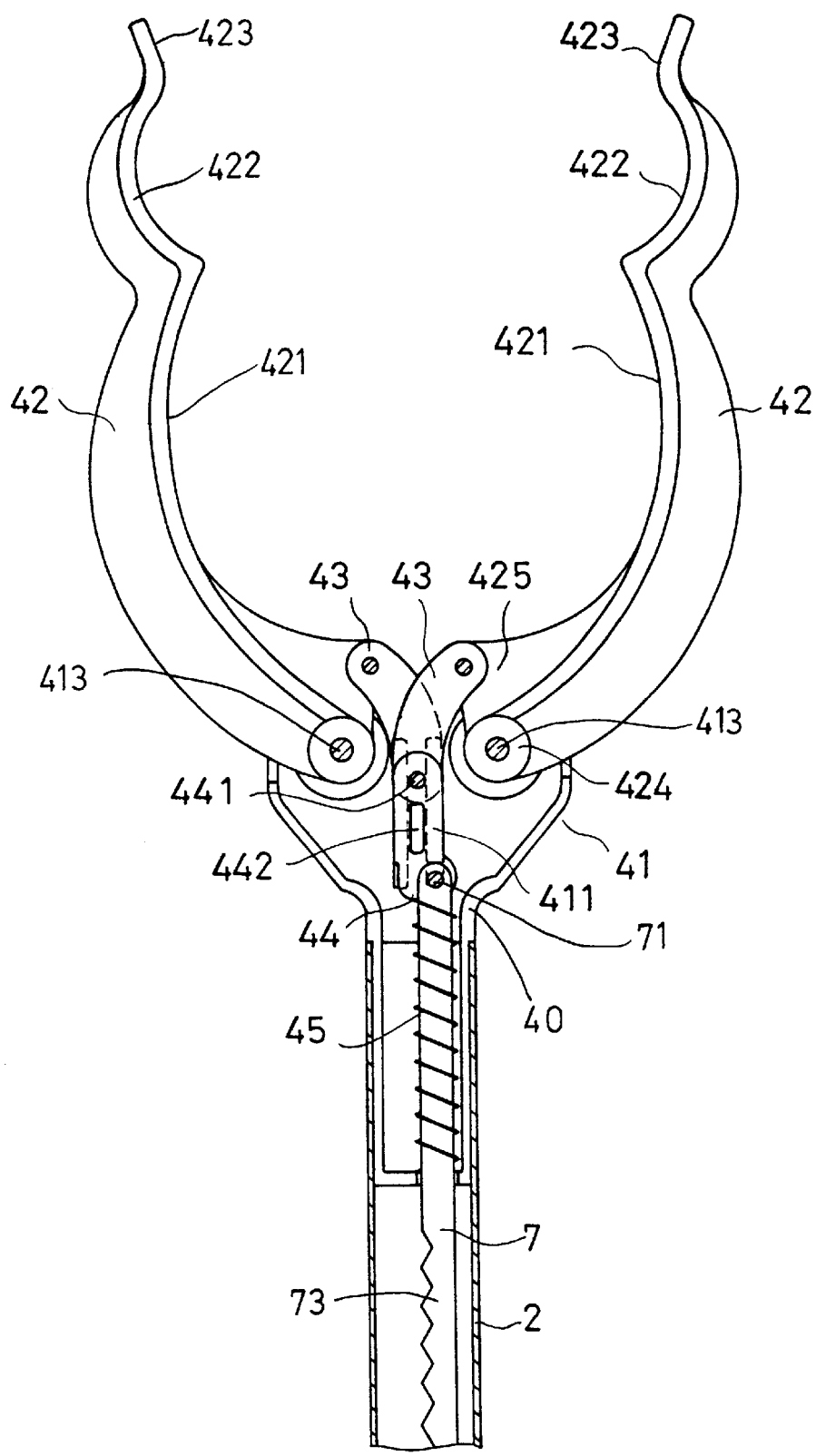
FIG. 11 is a partial cross sectional view taken along lines 11—11 of FIG. 1.
Figure 12:
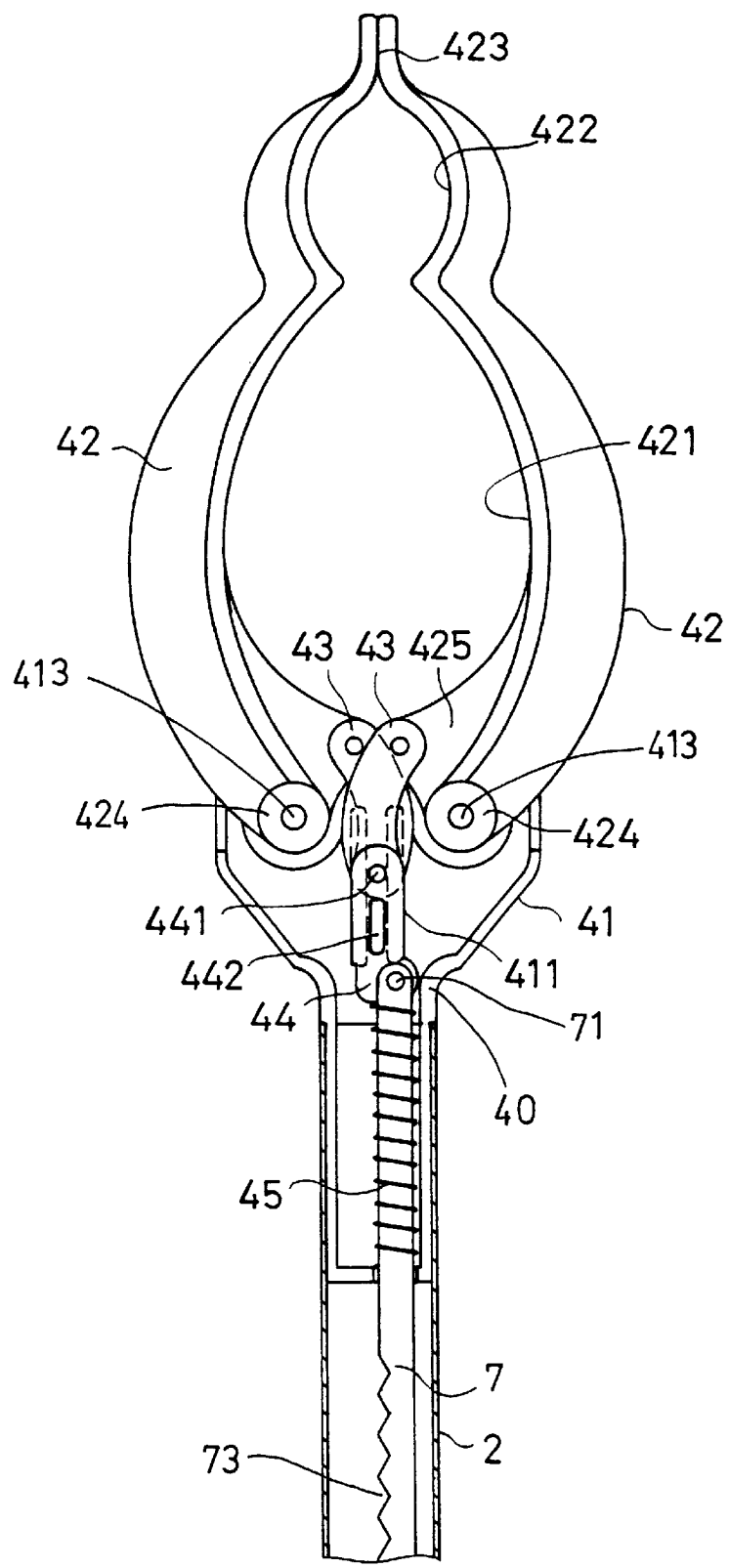
FIG. 12 is a partial cross sectional view similar to FIG. 11, illustrating the operation of the gripping device.

In operation, as shown in FIG. 8, the spring 34 may bias and force the teeth 324 of the bar 32 to engage with the teeth 73 of the beam 7, such that the gripping fingers 42 may be actuated by the hand grip 11 via the cable 7 and the bar 32 and the housing 31 and the beam 7. The curved recesses 421, 422, 423 of different curvatures and of the gripping fingers 42 may be used for holding or grasping or gripping objects of different diameters. As shown in FIG. 3, when the hand grip 11 is pulled toward the handle body 10 in order to pull the cable 6 rearward toward the handle body 10, the teeth 131 of the pawl 13 may be forced to engage with the sector gear 12, in order to prevent the hand grip 11 from moving away from the handle body 10. The objects may thus be solidly held in or by the gripping fingers 42 even when the hand grip 11 is released. Accordingly, the users may release the hand grip 11 after the gripping fingers 42 has grasped the objects that are required to be grasped and moved.

As shown in FIG. 4, when the pawl 13 is moved inward of the hand grip 11 against the spring 14, the teeth 131 of the pawl 13 may be disengaged from the sector gear 12, such that the hand grip 11 is released and may be pulled toward and away from the handle body 10 freely. The tongue 152 of the button 15 may be engaged into the lock notch 132 of the pawl 13 in order to lock the pawl 13 to the hand grip 11, and in order to release the hand grip 11 relative to the handle body 10.

As shown in FIGS. 3, 4, the extension 161 of the rod 16 may be engaged with the seat 117 of the hand grip 11 in order to limit the forward movement of the hand grip 11 relative to the handle body 10. As shown in FIG. 5, when the extension 161 of the rod 16 may be rotated or disengaged from the seat 117 of the hand grip 11 for allowing the hand grip 11 to further rotated or slightly move forward or away from the handle body 10. The additional forward moving distance of the hand grip 11 and the cable is slightly longer than the distance 323 (FIG. 8) formed between the sleeve 30 and the extension 322 of the bar 32. Accordingly, when the extension 161 of the rod 16 is disengaged from the seat 117 of the hand grip 11, the hand grip 11 is allowed to slightly moved forward or away from the handle body 10, the extension 322 of the bar 32 may engage with the sleeve 30, and the housing 31 may still be moved forward toward the sleeve 30 by the cable 6, such that the bar 32 may be moved and forced away from the beam 7 by the sliding movement of the poles 33 in the inclined slots 321.

When the bar 32 is disengaged from the beam 7, the sleeve 30 and the tube 1 and the bar 32 may be moved relative to the beam 7 and the pipe 2, in order to adjust the tube 1 relative to the pipe 2, when the catch 231 of the latch 23 is disengaged from the tube 1 by the cam 29 and the lever 24. Accordingly, the gripping fingers 42 and the pipe 2 may be adjusted and moved toward or away from the handle body 10. When the extension 161 of the rod 16 is rotated and caused to engage with the seat 117 of the hand grip 11 again, the hand grip 11 may be slightly moved rearward or toward the handle body 10, or slightly moved away from the gripping fingers 42 and the sleeve 30. The extension 322 of the bar 32 may thus be released or disengaged from the sleeve 30, and the teeth 324 of the bar 32 may be biased to engage with the teeth 73 of the beam 7 again in order to couple the bar 32 and the housing 31 and the cable 6 and the beam 7 together, and for allowing the gripping fingers 42 to be actuated by the hand grip 11 via the cable 6 again. The catch 231 of the latch 23 may be forced to engage into either of the cavities 120 of the tube 1 (FIG. 7) again by the cam 29 and the lever 24 after the tube 1 has been adjusted relative to the pipe 2.

Accordingly, the gripping device in accordance with the present invention includes a locking mechanism for locking the gripping fingers in the holding or grasping or gripping position.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A gripping device comprising:
    a handle body,
    a hand grip rotatably secured to said handle body with a shaft, and rotatable toward and away from said hand grip about said shaft,
    a base secured to said handle body,
    a pair of gripping fingers rotatably secured to said base and rotatable toward and away from each other,
    means for coupling said hand grip to said gripping fingers to actuate said gripping fingers to grasp an object with said hand grip,
    means for locking said hand grip to said handle body, and
    means for limiting a relative movement between said hand grip and said handle body, said limiting means including a rod rotatably secured to said handle body and having an extension for detachably engaging with said hand grip by rotating said rod relative to said handle body.

2. The gripping device according to claim 1, wherein said locking means includes a pawl rotatably secured to said hand grip and having a first end for engaging with said handle body and for locking said hand grip to said handle body when said hand grip is rotated toward said handle body.

3. The gripping device according to claim 2, wherein said handle body includes a plurality of teeth formed therein, said first end of said pawl includes at least one tooth formed thereon for engaging with said teeth of said handle body and for locking said hand grip to said handle body.

4. The gripping device according to claim 3, wherein said handle body includes a sector gear secured therein and having said teeth provided thereon for engaging with said at least one tooth of said pawl.

5. The gripping device according to claim 2 further comprising means for biasing said first end of said pawl to engage with said handle body.

6. The gripping device according to claim 2 further comprising means for latching said pawl to said hand grip.

7. The gripping device according to claim 1, wherein said coupling means includes a follower slidably received in said base, a pair of links pivotally coupling said follower to said gripping fingers respectively, and means for connecting said follower to said hand grip.

8. The gripping device according to claim 1 further comprising a tube secured to said handle body, and a pipe secured between said tube and said base.

9. The gripping device according to claim 8 further comprising means for adjusting said tube relative to said pipe.

10. A gripping device comprising:
    a handle body,
    a hand grip rotatably secured to said handle body with a shaft, and rotatable toward and away from said hand grip about said shaft,
    a base secured to said handle body,
    a pair of gripping fingers rotatably secured to said base and rotatable toward and away from each other,
    means for coupling said hand grip to said gripping fingers to actuate said gripping fingers to grasp an object with said hand grip,
    means for locking said hand grip to said handle body, said locking means including a pawl rotatably secured to said hand grip and having a first end for engaging with said handle body and for locking said hand grip to said handle body when said hand grip is rotated toward said handle body, and
    means for latching said pawl to said hand grip, said latching means including a button slidably secured to said hand grip and having a tongue for engaging with said pawl and for latching and locking said pawl to said hand grip.

11. The gripping device according to claim 10 further comprising means for positioning said button to said hand grip.

12. A gripping device comprising:
    a handle body,
    a hand grip rotatably secured to said handle body with a shaft, and rotatable toward and away from said hand grip about said shaft,
    a base secured to said handle body,
    a pair of gripping fingers rotatably secured to said base and rotatable toward and away from each other,
    means for coupling said hand grip to said gripping fingers to actuate said gripping fingers to grasp an object with said hand grip, said coupling means including a follower slidably received in said base, a pair of links pivotally coupling said follower to said gripping fingers respectively, and means for connecting said follower to said hand grip, said connecting means including a beam secured to said follower, a cable secured to said hand grip, and means for detachably securing said cable to said beam, and means for locking said hand grip to said handle body.

13. The gripping device according to claim 12, wherein said detachably securing means includes a plurality of teeth formed on said beam, a bar for coupling to said cable and having at least one tooth formed thereon for engaging with said teeth of said beam, and means for forcing said at least one tooth of said bar to said teeth of said beam.

14. The gripping device according to claim 13, wherein said forcing means includes a housing secured to said cable, said beam is engaged in said housing, said bar is slidably received in said housing, and means for guiding said bar toward said beam.

15. The gripping device according to claim 14, wherein said guiding means includes at least one pole secured in said housing, and at lease one inclined slot formed in said bar for slidably receiving said at least one pole and for guiding said bar to move toward said beam.

16. The gripping device according to claim 15, wherein said guiding means includes means for biasing said bar toward said base.

\* \* \* \* \*